Aug. 6, 1929.  W. TATE  1,723,095
WINDOW SHUTTER
Filed Nov. 12, 1925
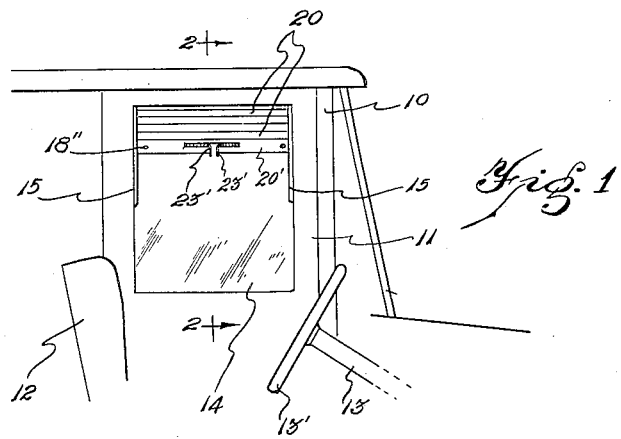
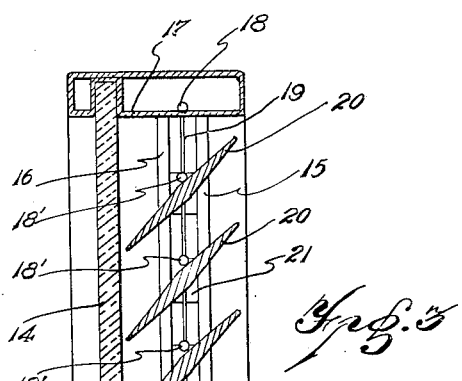
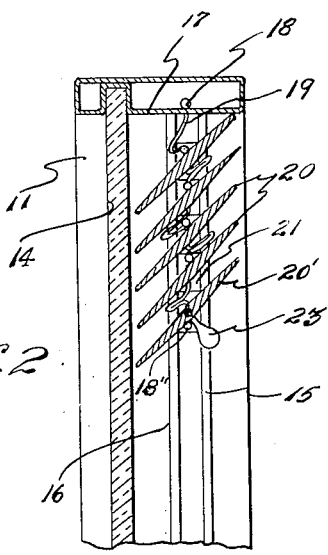
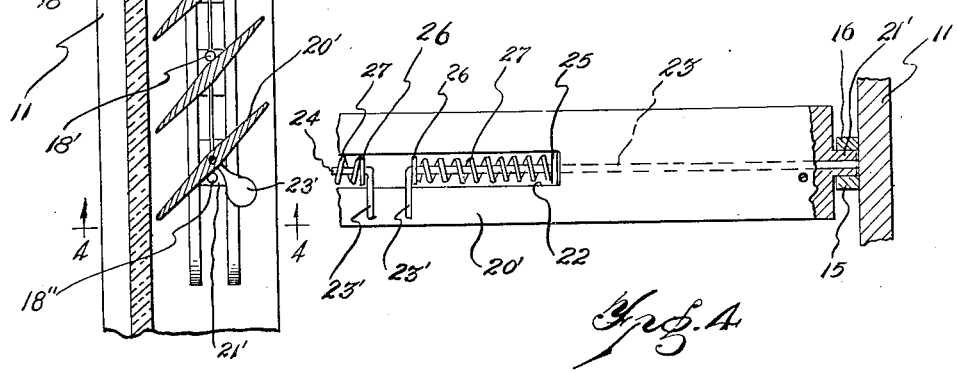
INVENTOR.
WILLIAM TATE
BY
*Thos. L. Donnelly*
ATTORNEY.

Patented Aug. 6, 1929.

1,723,095

UNITED STATES PATENT OFFICE.

WILLIAM TATE, OF FLINT, MICHIGAN.

WINDOW SHUTTER.

Application filed November 12, 1925. Serial No. 68,565.

My invention relates to a new and useful improvement in a window shutter adapted for use primarily for mounting on the side window of a closed body of a vehicle, especially the window formed in the upper portion of the front door, the object of the invention being to provide a device for shielding the driver of the vehicle from the rays of sun which may be directed toward the side of the vehicle, to assist the driver in the operation of the vehicle.

Another object of the invention is the provision of a shutter device of the class described, which may be easily and quickly moved to operative or inoperative position and which, while in operative position, will shield the driver of the vehicle from the rays of sun directed toward the side of the vehicle, while at the same time permitting the driver to have a line of vision outwardly from the vehicle within certain limits.

Another object of the invention is the provision of a shutter device of this class, which will be simple in structure, economical of manufacture and highly efficient in use.

Other objects of the invention will appear hereinafter.

The invention consists in the combination and arrangement of parts hereinafter described and claimed.

The invention will be best understood from a reference to the accompanying drawings, which form a part of this specification and in which, Fig. 1 is a side elevational view of the invention, showing it applied to a vehicle body, shown in fragment, Fig. 2 is a fragmentary sectional view taken on substantially line 2—2 of Fig. 1, Fig. 3 is a view similar to Fig. 2, showing the device in operative position, Fig. 4 is a fragmentary view taken on substantially line 4—4 of Fig. 3, showing parts in section and parts in elevation.

As shown in the drawings, the invention is adapted for use with a vehicle having a closed body 10, provided with a forwardly positioned door 11, located at the side of the seat 12, customarily occupied by the driver while propelling the vehicle, the steering post 13 and wheel 13' mounted thereon being shown in Fig. 1, for the purposes of indicating clearly the location of the invention as used on a vehicle body. The door 11 is provided with a window having the transparent closure 14 mounted therein. Mounted on the frame of the window in the door 11 and extending vertically at opposite sides of this frame in spaced relation to each other are guide strips 15 and 16. Projected through the upper cross-rail 17 of the window frame is a cord or other flexible member 19 to the upper end of which is secured a small ball 18 to prevent the flexible member 19 being pulled downwardly out of the opening formed in the rail 17. A pair of these flexible members 19 is used, one being mounted at each side of the window opening formed in the door 11. This flexible member 19 is also projected through a plurality of shutter slats 20, a ball 18' being fixedly mounted upon the flexible member 19 above each of the shutter slats 20. A lowermost shutter slat 20' is provided with an opening through which the flexible member 19 projects, this member 19 carrying, at its lower end, in fixed relation, a ball 18'', to prevent its removal from the shutter slat 20'. Projecting outwardly from the opposite ends of each of the shutter slats 20 is a square trunnion 21, adapted for slidable fit between the guide strips 15 and 16.

Similar square trunnions 21' project outwardly from the opposite ends of the lowermost shutter slat 20', these trunnions 21' also engaging between the guide strips 15 and 16. Formed in the under-surface of the shutter slat 20' intermediate its ends is a longitudinally extending groove 22. Slidably positioned in the groove 22 and projecting through a passageway formed in the shutter slat 20' is a rod 23 adapted normally to project beyond one of the trunnions 21'. As shown in Fig. 4, a similar rod 24 is provided, for projecting longitudinally toward the opposite end of the shutter slat 20'. The adjacent ends of each of these rods 23 and 24 are provided with an angularly turned gripping portion 23'. Fixedly mounted upon the rods 23 and 24 is a collar 25, adapted to engage one end of a spiral spring 27 positioned on the rods 23 and 24 in embracing relation, the opposite end of said spring engaging a stationary abutment 26 which is fixedly mounted in the shutter slat 20'. The arrangement is such that the spring 27 normally retains the outer end of the rod 23 pressed into close engagement with the face of the window frame formed in the door 11.

In operation, when the sun's rays are not directed against the side of the vehicle, so as to cause inconvenience to the driver of the vehicle, by moving the gripping members 23' inwardly toward each other, the lowermost shutter slat 20' may be released for free slidable movement vertically of the door 11, and the shutters moved into close relation to each other, as shown in Fig. 2, leaving, as shown in Fig. 1, the major portion of the window pane 14 free for unobstructed vision. In moving the device to inoperative position, the slat 20' is moved upwardly until it engages the next above positioned slat carrying this slat with it and engaging each succeeding slat positioned above. When moving the device to operative position, the fingers 23' are moved inwardly toward each other and the slat 20' pulled downwardly, the ball 18 preventing the pulling of this slat 20' away from the flexible member 19. When the slack in the flexible member 19 extending between the lowermost slat and the one next above it is taken up, the flexible member 19 will serve to draw the next succeeding slat downwardly, the ball 18' serving as the necessary abutment for effecting this movement. Each succeeding slat is similarly pulled downwardly and when a sufficient area of the window is covered by the shutter, a release of the gripping members 23' will permit the rods 23 to lock the shutters in their adjusted position. The flexible member 19 is projected through the shutter slats so that the shutter slats will not by gravity move downwardly on this flexible member, and consequently, the abutment balls 18' need be positioned only on one side of the shutter slats.

It is believed evident that, on account of the incline of the shutter slats relatively to the vertical, the driver will be able to look outwardly through the shutter slats within certain limits. It is also believed evident that the device affords a simple and effective means for covering the portion of the window which may be desired to be covered.

While I have illustrated and described the preferred form of structure, I do not wish to limit myself to the precise form of structure shown, but desire to avail myself of such variations and modifications as come within the scope of the appended claims.

Having thus described my invention, what I claim as new and desire to secure by Letters Patent is:

1. In a shutter device of the class described, adapted for use with a window frame having a pair of spaced side rails connected by an upper rail, a pair of spaced guide members mounted on and extending longitudinally of each of said side rails; a plurality of shutter slats; a squared trunnion projecting outwardly from the opposite ends of each of said shutter slats and engaging between said guide members, said shutter slats being slidable longitudinally of said side rails, the lowermost slat having formed on its undersurface a longitudinally extending groove and communicating at opposite ends with an outwardly projecting passageway; a rod slidably mounted in each of said passageways and having its inner end angularly turned for forming a gripping surface, the gripping surface on one of said rods being normally spaced apart from the gripping surface on the other of said rods; a collar mounted on each of said rods, said collar engaging in said groove; an abutment member mounted in said groove; and a spring mounted on each of said rods engaging at one end with said collar and at its opposite end with said abutment member, said spring normally pressing said rod outwardly into engaging position with said side rails for resisting slidable movement of said slat relatively to said side rails.

2. A shutter device of the class described, adapted for use with a window frame having side walls, an upper rail, and a compartment above the lower surface of said upper rail, comprising: guide members mounted on and extending in spaced relation longitudinally of said side rails; a plurality of relatively movable shutter slats, said shutter slats being slidable on said side rails longitudinally thereof; flexible means projecting through said shutter slats, and projecting at the upper end into said compartment; means on said flexible means for preventing withdrawal of said end from said compartment; releasable and relatively movable friction means projecting outwardly from the ends of the lowermost of said slats for resisting slidable movement of the same longitudinally of said rails; a plurality of balls mounted on said flexible means between said slats and adapted upon downward movement of the lowermost of the said slats for engaging the upper surface of each of said slats and moving the same downwardly of said side rails; and a ball mounted on said flexible means for engaging the undersurface of the lowermost of said slats.

In testimony whereof I have signed the foregoing.

WILLIAM TATE.